(12) United States Patent
Elnekaveh et al.

(10) Patent No.: US 11,943,347 B2
(45) Date of Patent: Mar. 26, 2024

(54) GENERATION OF INITIAL NETWORK CREDENTIALS IN AN INTEGRATED TAMPER RESISTANT DEVICE

(71) Applicant: QUALCOMM Incorporated, San Diego, CA (US)

(72) Inventors: Or Elnekaveh, Hadera (IL); Ofir Alon, Haifa (IL); Shlomi Agmon, Jerusalem (IL)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 16/808,167

(22) Filed: Mar. 3, 2020

(65) Prior Publication Data
US 2020/0295931 A1    Sep. 17, 2020

Related U.S. Application Data

(60) Provisional application No. 62/817,446, filed on Mar. 12, 2019.

(51) Int. Cl.

| | |
|---|---|
| *H04L 9/08* | (2006.01) |
| *G06F 15/78* | (2006.01) |
| *G06F 21/44* | (2013.01) |
| *G06F 21/86* | (2013.01) |
| *H04L 9/06* | (2006.01) |
| *H04L 9/32* | (2006.01) |

(52) U.S. Cl.
CPC ........ *H04L 9/0869* (2013.01); *G06F 15/7807* (2013.01); *G06F 21/44* (2013.01); *G06F 21/86* (2013.01); *H04L 9/0662* (2013.01); *H04L 9/0819* (2013.01); *H04L 9/3247* (2013.01); *G06F 2221/2129* (2013.01)

(58) Field of Classification Search
CPC ... H04L 9/0869; H04L 9/0819; H04L 9/3247; H04L 9/0662; G06F 15/7807; G06F 21/86; G06F 2221/2129; G06F 21/44
See application file for complete search history.

(56) References Cited

U.S. PATENT DOCUMENTS

| | | | |
|---|---|---|---|
| 9,749,127 B1* | 8/2017 | Doane | H04L 67/10 |
| 2006/0149962 A1* | 7/2006 | Fountain | H04L 9/0897 |
| | | | 713/151 |
| 2011/0265158 A1* | 10/2011 | Cha | H04W 4/70 |
| | | | 726/6 |
| 2012/0072714 A1* | 3/2012 | Grandcolas | H04L 63/0853 |
| | | | 713/155 |
| 2016/0255080 A1* | 9/2016 | Griffin | H04L 63/06 |
| | | | 713/155 |

\* cited by examiner

*Primary Examiner* — Cheng-Feng Huang
(74) *Attorney, Agent, or Firm* — Loza & Loza, LLP

(57) ABSTRACT

In an aspect, an integrated tamper resistant device generates initial network credentials for accessing a network, wherein the initial network credentials enable the integrated tamper resistant device to be authenticated by a network solution provider before operational network credentials are provided securely by the network solution provider. The integrated tamper resistant device encrypts the initial network credentials and cryptographically signs the encrypted initial network credentials. The integrated tamper resistant device outputs the encrypted and signed initial network credentials for delivery to the network solution provider.

24 Claims, 10 Drawing Sheets

GENERATION OF INITIAL NETWORK CREDENTIALS IN AN INTEGRATED TAMPER RESISTANT DEVICE

PRIORITY CLAIM

This application claims priority to and the benefit of Provisional Patent Application No. 62/817,446, entitled "Generation of Initial Network Credentials in an Integrated Tamper Resistant Device," filed in the U.S. Patent and Trademark Office on Mar. 12, 2019, the entire contents of which are incorporated herein by reference as if fully set forth below in their entirety and for all applicable purposes. capability

BACKGROUND

Field of the Disclosure

Aspects of the disclosure relate generally to network devices, and more specifically, but not exclusively, to generation of initial network credentials in an integrated tamper resistant device.

Description of Related Art

Networks, such as cellular communication networks, typically authenticate a subscriber (e.g., a client device, such as a smartphone) before granting access to the network. Networks may authenticate client devices based on network credentials (e.g., cryptographic network credentials) provisioned to the client devices. Generally, such network credentials are tied to a subscriber identity and are stored on a tamper resistant element (TRE). For example, a client device may use the network credentials stored on the TRE to perform cryptographic authentication with the network.

Provisioning of network credentials to client devices may be performed in various ways. In one example, a network solution provider may install the network credentials on the TRE during manufacturing, requiring a high-level of security and knowledge of the needed subscriber identity. In another example, a client device may download network credentials over the air (e.g., to an embedded subscriber identity module (eSIM) in the client device), which requires access to an Internet connection. In some scenarios, however, these approaches for provisioning network credentials to client devices may be difficult and/or inadequate.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect of the disclosure, a method is provided. The method includes generating, in a secure environment of a processing device, initial network credentials for accessing a network, wherein the initial network credentials enable the secure environment of the processing device to be authenticated by a network solution provider before operational network credentials are provided securely by the network solution provider. The method further includes encrypting, in the secure environment of the processing device, the initial network credentials. The method further includes cryptographically signing, in the secure environment of the processing device, the encrypted initial network credentials. The method further includes outputting the encrypted and signed initial network credentials for delivery to the network solution provider.

In one aspect of the disclosure, an apparatus is provided. The apparatus contains an integrated tamper resistant device including a secure processing device. The integrated tamper resistant device generates initial network credentials for accessing a network. The initial network credentials enable the integrated tamper resistant device to be authenticated by a network solution provider before operational network credentials are provided securely by the network solution provider. The integrated tamper resistant device encrypts the initial network credentials. The integrated tamper resistant device cryptographically signs the encrypted initial network credentials. The integrated tamper resistant device outputs the encrypted and signed initial network credentials for delivery to the network solution provider.

In one aspect of the disclosure, an apparatus is provided. The apparatus includes means for generating, in a secure environment of a processing device, initial network credentials for accessing a network, wherein the initial network credentials enable the secure environment of the processing device to be authenticated by a network solution provider before operational network credentials are provided securely by the network solution provider. The apparatus further includes means for encrypting, in the secure environment of the processing device, the initial network credentials. The apparatus further includes means for cryptographically signing, in the secure environment of the processing device, the encrypted initial network credentials. The apparatus further includes means for outputting the encrypted and signed initial network credentials for delivery to the network solution provider.

In one aspect of the disclosure, a non-transitory processor-readable storage medium is provided. The non-transitory processor-readable storage medium has instructions stored thereon, which when executed by at least one processing circuit causes the at least one processing circuit to generate initial network credentials for accessing a network, wherein the initial network credentials enable the processing circuit to be authenticated by a network solution provider before operational network credentials are provided securely by the network solution provider. The instructions further cause the at least one processing circuit to encrypt the initial network credentials, cryptographically sign the encrypted initial network credentials, and output the encrypted and signed initial network credentials for delivery to the network solution provider.

In one aspect of the disclosure, a method for a client device including a processing device is provided. An integrated tamper resistant device (also referred to as a secure environment of the processing device) included in the processing device generates initial network credentials for accessing a network, wherein the initial network credentials enable the integrated tamper resistant device secure environment of the processing device to be authenticated by a network solution provider before operational network credentials are provided securely by the network solution provider. The integrated tamper resistant device encrypts the initial network credentials. The integrated tamper resistant device cryptographically signs the encrypted initial network credentials. The integrated tamper resistant device outputs the encrypted and signed initial network credentials for delivery to the network solution provider. The client device establishes a connection with the network solution provider based on the initial network credentials. The client device receives operational network credentials including operational subscriber identity data from the network solution provider. The integrated tamper resistant device replaces the initial network credentials with the operational network credentials.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
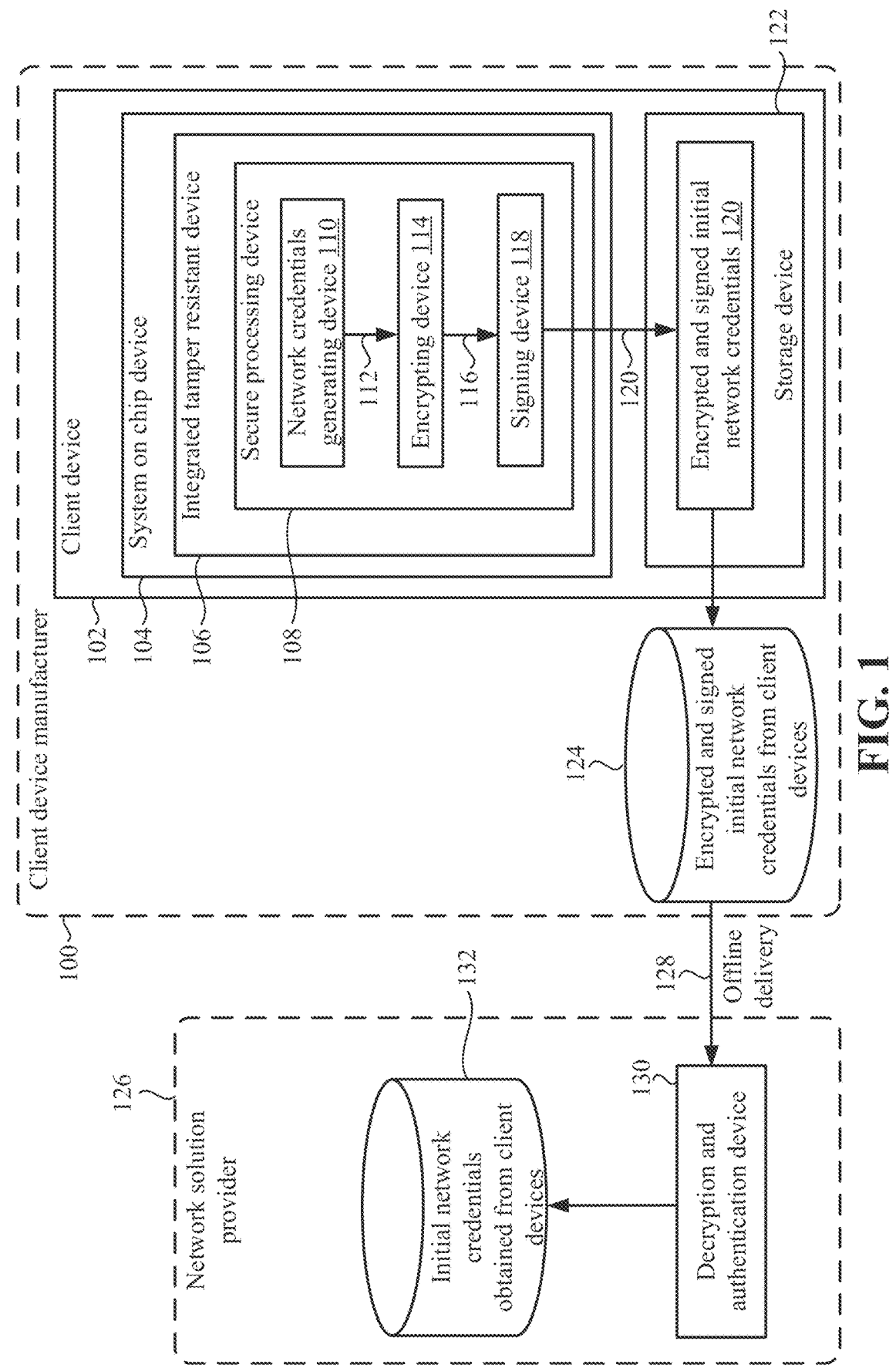
FIG. 1 illustrates an exemplary integrated tamper resistant device generating initial network credentials in accordance with various aspects of the disclosure.

Automatic Generation of Initial Network Credentials at an Integrated Tamper Resistant Device FIG. 1 illustrates an exemplary integrated tamper resistant device generating initial network credentials in accordance with various aspects of the disclosure. As shown in FIG. 1, a client device 102 produced by a client device manufacturer 100 may contain a system on chip device (SoC) 104. The term client device as used herein broadly refers to a diverse array of devices and technologies. For example, some non-limiting examples of a client device include a user equipment (UE), mobile, a cellular (cell) phone, a smart phone, a session initiation protocol (SIP) phone, a laptop, a personal computer (PC), a notebook, a tablet, a personal digital assistant (PDA), wearable devices (e.g., smart watches, glasses, etc.), and a broad array of embedded systems, e.g., corresponding to an "Internet of things" (IoT). As further shown in FIG. 1, the system on chip device (SoC) 104 may contain an integrated tamper resistant device 106 (also referred to as an integrated tamper resistant element). In some examples, the integrated tamper resistant device 106 may be a dedicated device that provides a secure environment in which sensitive operations (e.g., cryptographic functions) may be performed. In some aspects of the disclosure, the integrated tamper resistant device 106 may be a subsystem included in the system on chip (SoC) device 104. For example, the integrated tamper resistant device 106 may include a secure processing device 108 (also referred to as a secure processor or a secure processing circuit) that may not be accessed by other processing devices (e.g., a central processing unit (CPU)) included in the system on chip (SoC) device 104. In some examples, the integrated tamper resistant device 106 may further include a memory device (not shown in FIG. 1 for simplicity). For example, the memory device may be a volatile memory or a non-volatile memory, such as a read only memory (ROM) or a one time programmable (OTP) memory.

As shown in FIG. 1, the integrated tamper resistant device 106 may generate initial network credentials 112 (also referred to as network credentials, bootstrapping network credentials, bootstrapping network authentication data, or a bootstrapping profile). In some examples, the initial network credentials 112 may include data (e.g., subscriber identity data) that the client device 102 may use to perform cryptographic authentication with a network (e.g., a cellular network). The integrated tamper resistant device 106 may implement the network credentials generating device 110 to generate the initial network credentials 112. In some examples, the network credentials generating device 110 may be a random number generator (RNG) circuit included in the integrated tamper resistant device 106. In other examples, the network credentials generating device 110 may be at least a portion of the secure processing device 108 configured to execute instructions of a random number generating operation.

The network credentials 112 may include an initial network identity that the client device 102 may use to access a network (e.g., a cellular network). In the aspects described herein, the initial network credentials 112 may include unique data (also referred to as diversified data or personalized data) that may serve as the initial network identity. In some aspects of the disclosure, the unique data may be a random number generated by the network credentials generating device 110 or a number derived from the generated random number. The unique data may be unknown to the client device manufacturer 100 and the portions of the client device 102 external to the integrated tamper resistant device 106. In some examples, the initial network credentials 112 may include a cryptographic key (e.g., a public key) provided by the integrated tamper resistant device 106 in addition to the unique data. In some examples, the initial network credentials 112 may further include information that is specific to the client device 102, such as an international mobile equipment identity (IMEI) assigned by the client device manufacturer 100.

As shown in FIG. 1, the integrated tamper resistant device 106 may encrypt the initial network credentials 112. The integrated tamper resistant device 106 may implement the encrypting device 114 to encrypt the initial network credentials 112. In some examples, the encrypting device 114 may be an encryption circuit included in the integrated tamper resistant device 106. In other examples, the encrypting device 114 may be at least a portion of the secure processing device 108 configured to execute one or more instructions of an encryption procedure. The encrypting device 114 may include a pre-set cryptographic key (e.g., a public key) provided by the network solution provider 126. In some aspects of the disclosure, the encrypting device 114 may receive input data (e.g., the initial network credentials 112 in plain text or clear text form), perform an encryption operation on the input data (e.g., using a public key from the network solution provider 126), and output encrypted data (also referred to as ciphertext).

As shown in FIG. 1, the integrated tamper resistant device 106 may sign the encrypted initial network credentials 116 to generate encrypted and signed initial network credentials 120. The integrated tamper resistant device 106 may implement the signing device 118 to digitally sign the encrypted initial network credentials 116. In some aspects of the disclosure, the signing device 118 may be a cryptographic signing circuit included in the integrated tamper resistant device 106. In other examples, the signing device 118 may be at least a portion of the secure processing device 108 configured to execute one or more instructions of a cryptographic signature generating procedure. The integrated tamper resistant device 106 may sign the encrypted initial network credentials 116 to provide proof of the authenticity of the encrypted initial network credentials 116. This may enable the receiver of the encrypted data (e.g., the network solution provider 126) to verify that the encrypted data was produced by a genuine integrated tamper resistant device (e.g., the integrated tamper resistant device 106). In some examples, the signing device 118 may sign the encrypted initial network credentials 116 using signing keys provisioned by a manufacturer of the integrated tamper resistant device 106. The signing keys may be based on a public key infrastructure (PKI) and may be authenticated based on a certificate from a certificate authority. In some examples, the signing device 118 may sign the encrypted initial network credentials 116 using a secret value that is shared between the integrated tamper resistant device 106 and the network solution provider 126.

As shown in FIG. 1, the integrated tamper resistant device 106 may be configured to output the encrypted and signed initial network credentials 120, which may be stored by the client device 102 in the storage device 122. The storage device 122 may be a non-secure storage device.

The client device manufacturer 100 may obtain the encrypted and signed initial network credentials 120 from the client device 102 and may store the encrypted and signed initial network credentials 120 in a storage device 124. In some examples, the storage device 124 may include encrypted and signed initial network credentials from a number of other client devices. As shown in FIG. 1, the client device manufacturer 100 may deliver 128 the encrypted and signed initial network credentials 120 to the network solution provider 126. In some aspects of the disclosure, the client device manufacturer 100 may deliver 128 some or all of the encrypted and signed initial network credentials collected in the storage device 124. In some examples, the network solution provider 126 may be a mobile network operator, a SIM card vendor, a corporate entity, or any other entity configured to honor the initial network credentials 112. If the network solution provider 126 is a SIM card vendor, for example, the SIM card vendor may process (e.g., decrypt) the encrypted and signed initial network credentials 120 and may securely deliver the initial network credentials to a mobile network operator.

The network solution provider 126 may implement a decryption and authentication device 130 to decrypt the encrypted and signed initial network credentials 120 of the client device 102 to recover the initial network credentials 112. In some aspects of the disclosure, the decryption and authentication device 130 may be a decryption and authentication circuit. In other examples, the decryption and authentication device 130 may be a processor configured to execute one or more instructions of a decryption operation and an authentication operation. The network solution provider 126 may verify the authenticity of the encrypted and signed initial network credentials 120 (e.g., using a public key infrastructure (PKI) certificate or by authenticating a digital signature appended to the encrypted and signed initial network credentials 120) to ensure that the encrypted and signed initial network credentials 120 were produced by an genuine integrated tamper resistant device (e.g., the integrated tamper resistant device 106). The network solution provider 126 may store the initial network credentials in a storage device 132. In some examples, the network solution provider 126 may also use the storage device 132 to store the initial network credentials of other client devices. The network solution provider 126 may implement the decryption and authentication device 130 and the storage device 132 in a secure environment to preserve the confidentiality of the initial network credentials (e.g., to prevent an unauthorized party from viewing, obtaining, or accessing the initial network credentials).

In some aspects of the disclosure, the initial network credentials (e.g., initial network credentials 112) described herein may include initial network identity data (also referred to as temporary subscriber identity data) that may be used by the network solution provider 126 to enable network authentication and connectivity for the client device 102. For example, upon an initial connection established between the client device 102 and the network supported by the network solution provider 126 based on the initial network credentials 112, the network solution provider 126 may provide the integrated tamper resistant device 106 operational network credentials (e.g., including permanent subscriber identity data) that are intended to replace the initial network credentials 112. The client device 102 may then implement the integrated tamper resistant device 106 to replace the initial network credentials 112 with the operational network credentials and to use the operational network credentials for subsequent connections with the network. In some scenarios, depending on the algorithm and information used by the integrated tamper resistant device 106 to generate the initial network credentials 112, the initial network credentials 112 may be the same as initial network credentials sent from one or more other integrated tamper resistant devices. This scenario may be referred to as an initial network credential collision. The network solution provider 126 may determine to ignore such collisions or may apply rules for handling or mitigating such initial network credential collisions.

In some aspects of the disclosure, the network credentials generating device 110 may be configured to generate a secret seed, which may be used to deterministically derive one or more secondary initial network credentials. In some examples, the initial network credentials 112 may include the secret seed. In other examples, the secure processing device 108 of the integrated tamper resistant device 106 may generate the secret seed and may encrypt and sign the secret seed for delivery to the network solution provider 126. In some aspects of the disclosure, the encrypted and signed secret seed may be delivered to the network solution provider 126 instead of the encrypted and signed initial network credentials 120. For example, if the encrypted and signed initial network credentials 120 includes the secret seed, the network solution provider 126 may implement the decryption and authentication device 130 to decrypt the encrypted and signed initial network credentials 120 to recover the secret seed. The network solution provider 126 may use the secret seed to deterministically derive one or more secondary initial network credentials. For example, each of the one or more secondary initial network credentials may be associated with a different network. In some examples, the network solution provider 126 may use the authenticated and decrypted initial network credentials as a secret seed value to deterministically derive one or more secondary initial network credentials.

In some aspects of the disclosure, components of the client device 102 external to the integrated tamper resistant device 106 may not have access to the initial network credentials generated by the integrated tamper resistant device 106. For example, and as described in detail herein, if the integrated tamper resistant device 106 is implemented as a part of a system on chip (SoC) device, portions of the SoC device external to the integrated tamper resistant device 106 may not have access to the initial network credentials generated by the integrated tamper resistant device 106. Moreover, the network solution provider 126 may ensure the security of the initial network credentials obtained from the decryption and authentication device 130.

Therefore, in some examples, the initial network credentials (e.g., the initial network credentials 112) generated by the integrated tamper resistant device 106 may serve as temporary bootstrapping network credentials that enable the client device 102 to access a mobile network (e.g., a cellular network supported by the network solution provider 126) without first establishing a local area network connection (e.g., a Wi-Fi connection) to obtain operational network credentials (e.g., cellular or mobile profiles that include permanent subscriber data). This may provide a more convenient out-of-the-box experience for a user of the client device and may facilitate manufacturing of the client devices. In some examples, the client devices described herein may use the network connection established with the bootstrapping network credentials to obtain (e.g., over the air) operational and more permanent subscriber data.

The aspects described herein may allow a client device manufacturer to assemble client devices containing integrated tamper resistant devices without having to know the specific characteristics (e.g., subscriber data that may be tied to the integrated tamper resistant devices) of each integrated tamper resistant device. Since the initial network credentials generated by the integrated tamper resistant devices included in the client devices are encrypted, the initial network credentials may be opaque to the manufacturer of the client devices. Accordingly, the aspects described herein may reduce the amount of security needed during assembly of the client devices containing the integrated tamper resistant devices.

Figure 2:
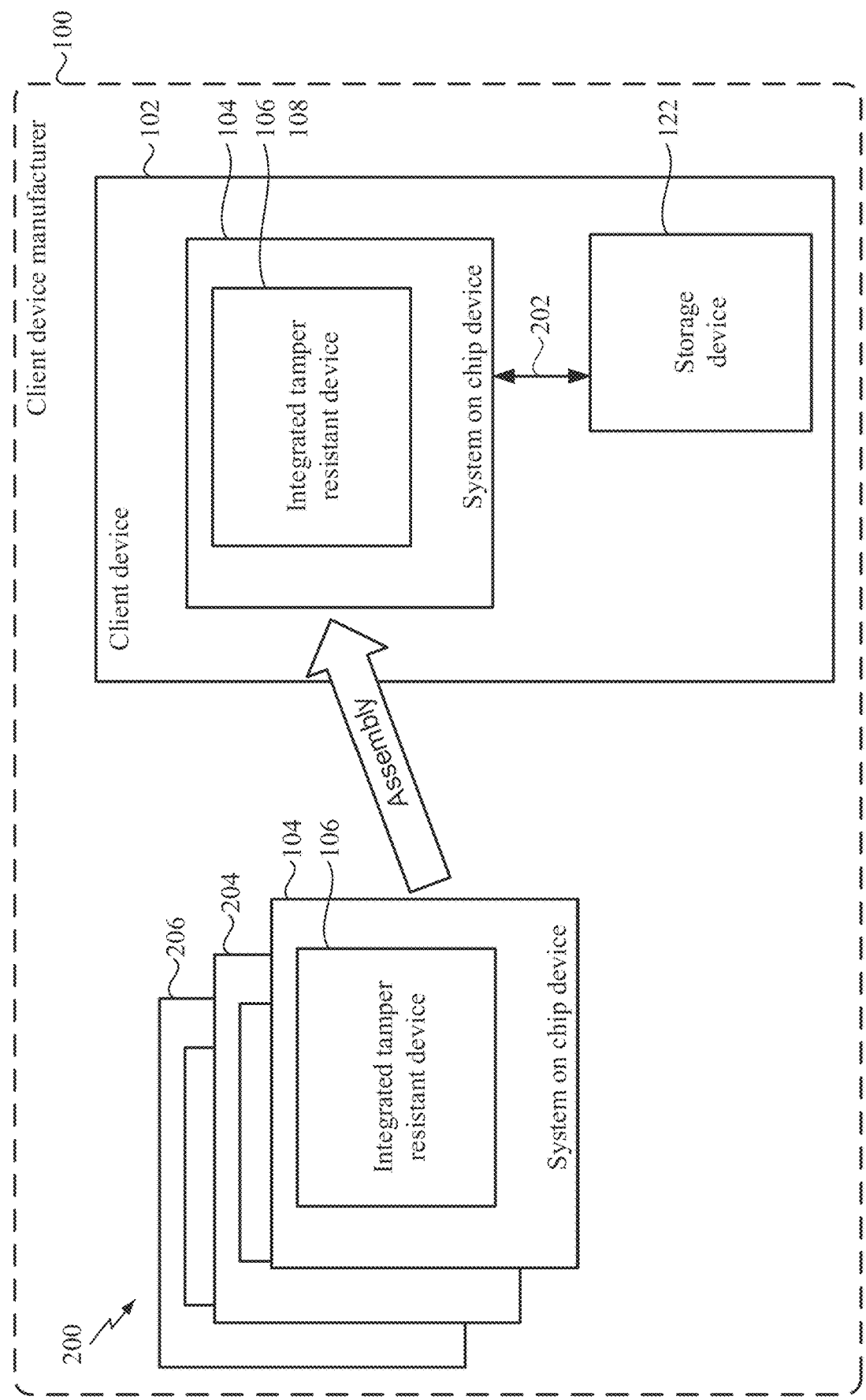
FIG. 2 illustrates an example assembly of a client device including installation of a system on chip (SoC) device containing an integrated tamper resistant device in accordance with various aspects of the disclosure.

FIG. 2 illustrates an example assembly of a client device including installation of a system on chip (SoC) device containing an integrated tamper resistant device in accordance with various aspects of the disclosure. With reference to FIG. 2, the client device manufacturer 100 may obtain system on chip (SoC) devices 200 (e.g., SoC devices 104, 204, 206) containing integrated tamper resistant devices from a supplier. As shown in FIG. 2, prior to being assembled in a client device, each of the system on chip (SoC) devices 200 may not include a secure storage device and/or may not have access to any storage devices (e.g., a flash memory device). Therefore, since each integrated tamper resistant device may not have access to a storage device, the manufacturer of the integrated tamper resistant devices may not be able to provision network credentials (e.g., subscriber identity data) for each integrated tamper resistant device. Continuing with FIG. 2, the client device manufacturer 100 may install each of the SoC devices 200 in a different client device. For example, the client device manufacturer 100 may install the SoC device 104 in the client device 102. As shown in FIG. 2, after the client device 102 is assembled, the system on chip (SoC) device 104 may be in communication with the storage device 122 via the data path 202.

Figure 3:
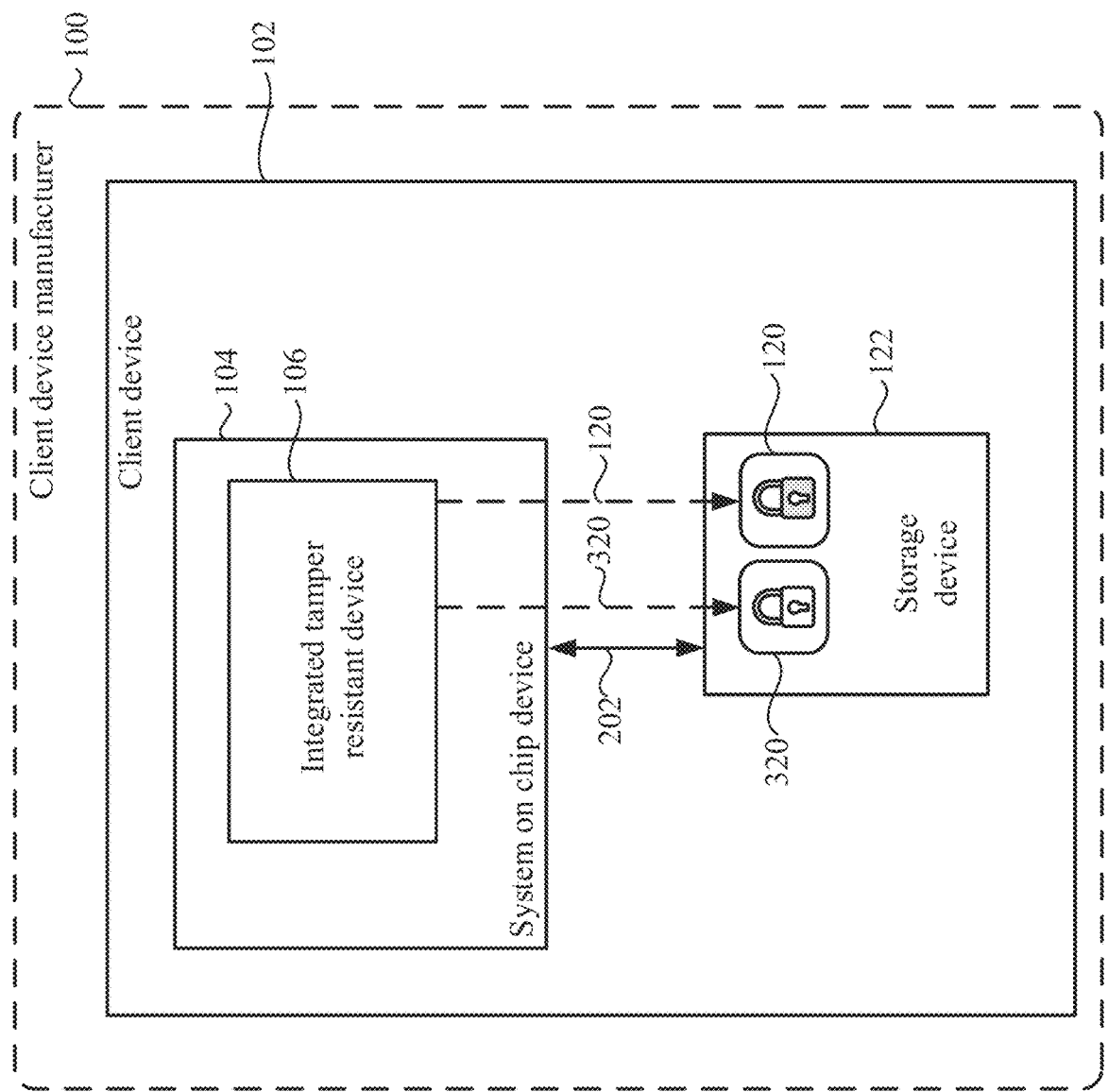
FIG. 3 illustrates an example client device generating initial network credentials in accordance with various aspects of the disclosure.

FIG. 3 shows the client device 102 containing the integrated tamper resistant device 106 in accordance with various aspects of the disclosure. The integrated tamper resistant device 106 may automatically generate initial network credentials (e.g., initial network credentials 112) and may encrypt and sign the initial network credentials. For example, the integrated tamper resistant device 106 may be configured to automatically generate the initial network credentials when the client device 102 is turned on for the first time, or in response to an instruction or command.

In some aspects of the disclosure, the integrated tamper resistant device 106 may be configured to encrypt and sign the initial network credentials for delivery to a network solution provider and to encrypt and sign the initial network credentials for local use. For example, the integrated tamper resistant device 106 may encrypt the initial network credentials (e.g., initial network credentials 112) with a public key of the network solution provider and may sign the encrypted initial network credentials to obtain the encrypted and signed initial network credentials 120. The integrated tamper resistant device 106 may then output the encrypted and signed initial network credentials 120 to the storage device 122 as shown in FIG. 3. Continuing with this example, the integrated tamper resistant device 106 may also encrypt the initial network credentials (e.g., initial network credentials 112) with a key specific to the integrated tamper resistant device 106 (e.g., a key that is only known to the integrated tamper resistant device 106). The integrated tamper resistant device 106 may sign the encrypted initial network credentials to obtain the encrypted and signed initial network credentials 320. The integrated tamper resistant device 106 may then output the encrypted and signed initial network credentials 320 to the storage device 122 as shown in FIG. 3. Therefore, by storing the encrypted and signed initial network credentials 320 in the storage device 122, the integrated tamper resistant device 106 may be able to access the initial network credentials 112 after the encrypted and signed initial network credentials 120 have been delivered to a network solution provider.

It should be noted that the integrated tamper resistant device 106 may store encrypted and signed initial network credentials 120 (and the encrypted and signed initial network credentials 320) on the storage device 122, even if the storage device 122 is considered a non-secure storage device (e.g., external to the integrated tamper resistant device 106). Although the client device 102 has access to the storage device 122 and may read, write and modify the ciphertext of the encrypted and signed initial network credentials 120 stored in the storage device 122, it may be difficult or intrusive for the client device manufacturer 100 to decipher the initial network credentials and obtain the cleartext of the encrypted and signed initial network credentials 120. Additionally, the client device manufacturer 100 may not have the time or resources (e.g., network connectivity and support) to provision the network credentials to the client device 102. Moreover, since the network credentials may include secure information such as subscriber identity data, the client device manufacturer 100 may not have the requisite security in place to securely provision the network credentials to the client device 102.

Figure 4:
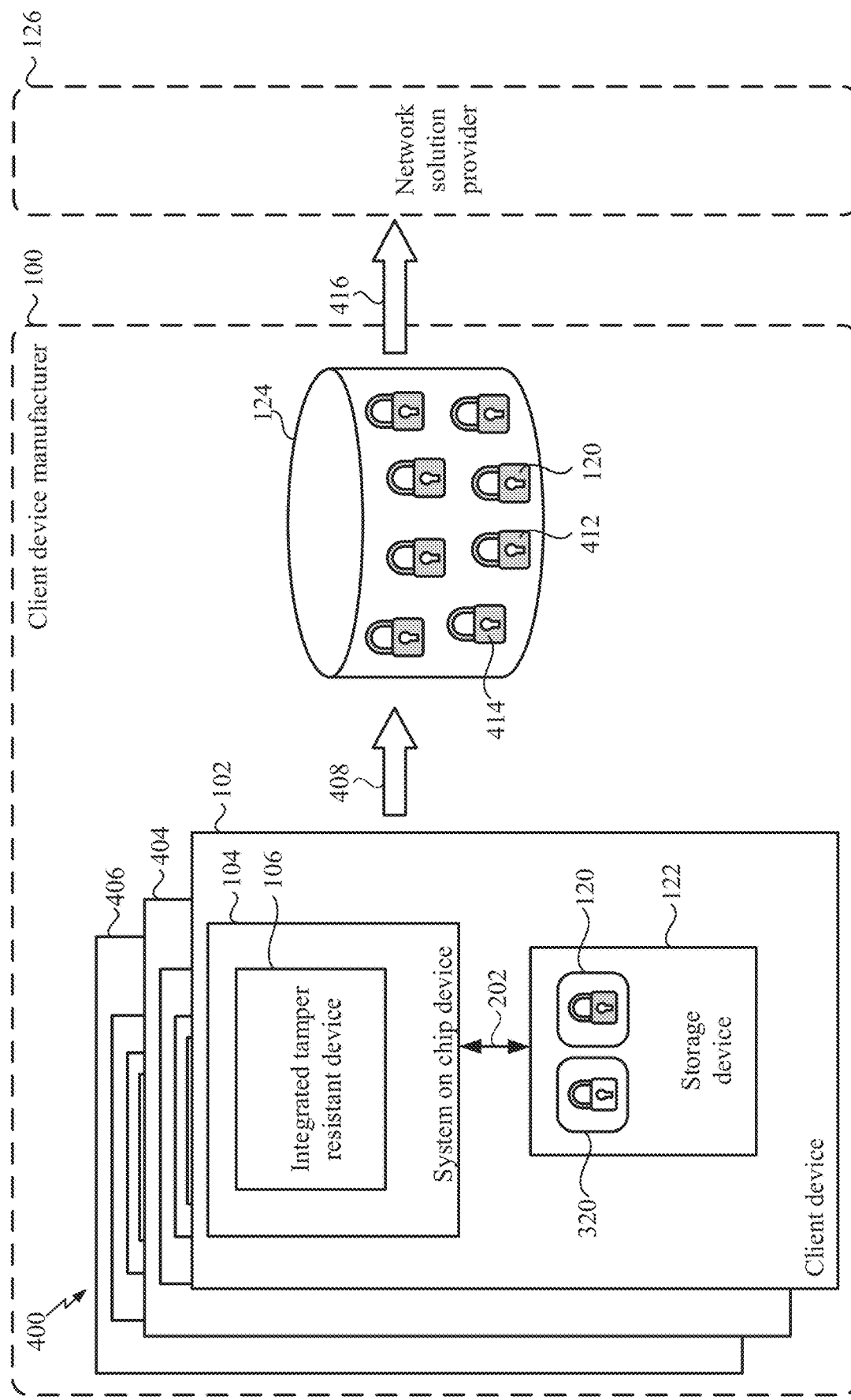
FIG. 4 illustrates a client device manufacturer delivering encrypted and signed initial network credentials to a network solution provider.

With reference to FIG. 4, the client device manufacturer 100 may assemble a number of client devices 400 (e.g., client devices 102, 404, 406). Each of the client devices 400 may generate and store their own encrypted and signed initial network credentials. The client device manufacturer 100 may obtain 408 the encrypted and signed initial network credentials from each of the client devices 400. In some examples, the client device manufacturer 100 may store the encrypted and signed initial network credentials from each of the client devices 400 in a storage device 124. For example, the storage device 124 may include the encrypted and signed initial network credentials 120, 412, 414 obtained from the client devices 102, 404, and 406. As shown in FIG. 4, the client device manufacturer 100 may deliver 416 one or more of the encrypted and signed initial network credentials stored in the storage device 410 to the network solution provider 126.

The network solution provider 126 may decrypt the encrypted and signed initial network credentials of the client devices 400 to recover the initial network credentials of each client device. The network solution provider 126 may verify the authenticity of the initial network credentials and may store the initial network credentials in a storage device. In accordance with the aspects described herein, the initial network credentials may include an initial network identity data that may be used by the network solution provider 126 to enable network authentication and connectivity for the client devices 400. Upon an initial connection established between a client device (e.g., client device 102, 404, 406) and the network supported by the network solution provider 126 based on the initial network credentials, the network solution provider 126 or another entity, may provide the client device operational network credentials (e.g., including permanent subscriber identity data) that is intended to replace the initial network credentials recovered from the encrypted and signed initial network credentials. The client device (e.g., client device 102, 404, 406) may then use the operational network credentials for subsequent connections with the network.

Figure 5A:
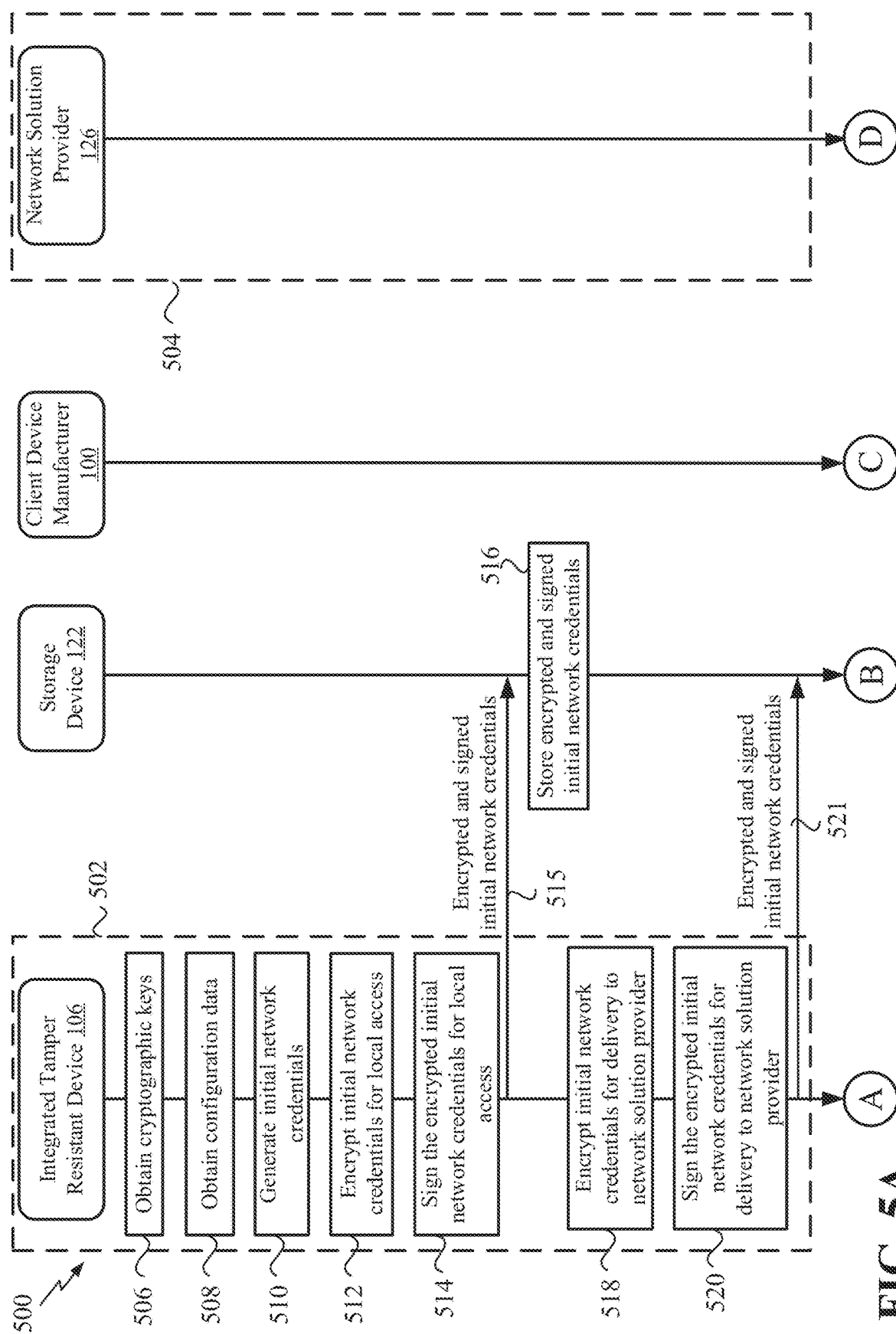
FIG. 5 (including FIGS. 5A and 5B) illustrates a signal flow diagram in accordance with various aspects of the disclosure.
Figure 5B:
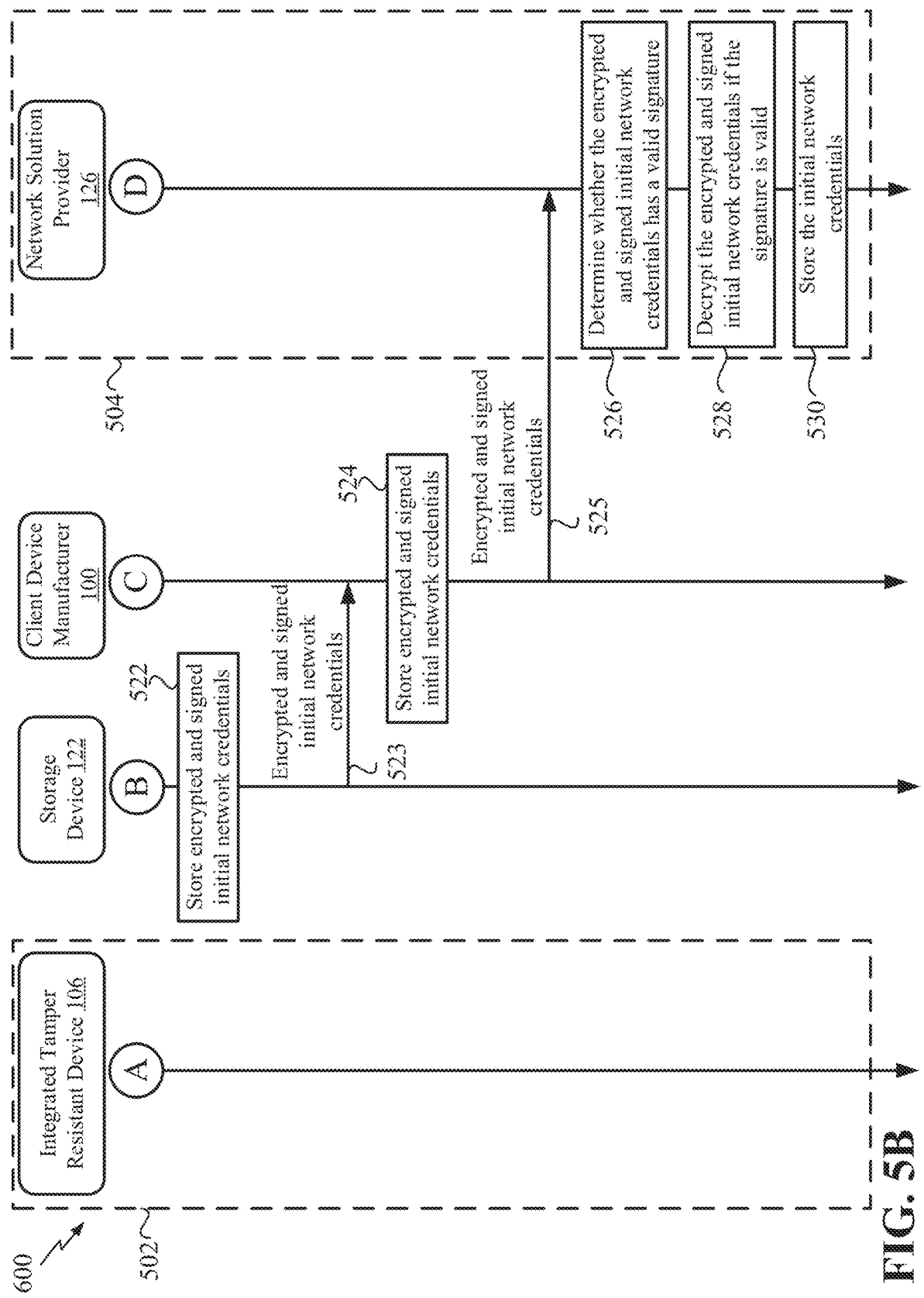

FIG. 5 (including FIGS. 5A and 5B) illustrates a signal flow diagram 500 in accordance with various aspects of the disclosure. FIG. 5 includes the integrated tamper resistant device 106, the storage device 122, the client device manufacturer 100, and the network solution provider 126. In FIG. 5, the areas within the dashed lines 502, 504 represent secure environments. For example, the operations 506, 508, 510, 512, 514, 518, and 520 depicted within the dashed lines 502 may be performed in a secure environment of the integrated tamper resistant device 106, and the operations 526, 528, and 530 depicted within the dashed lines 504 may be performed in a secure environment at the network solution provider 126.

As shown in FIG. 5A, the integrated tamper resistant device 106 may obtain one or more cryptographic keys 506. For example, the integrated tamper resistant device 106 may obtain a public cryptographic key of the network solution provider 126 and a cryptographic key specific to the integrated tamper resistant device 106. The one or more cryptographic keys may enable the integrated tamper resistant device 106 to prove its authenticity to a network. In some examples, a cryptographic key and optionally its certificate may be provisioned by a manufacturer of the integrated tamper resistant device 106. As further shown in FIG. 5A, the integrated tamper resistant device 106 may obtain configuration data 508. For example, the configuration data may be non-diversified data (e.g., standard or not unique data), such as a public key from the network solution provider 126 or a subscriber identity range.

The integrated tamper resistant device 106 may generate 510 initial network credentials (e.g., initial network credentials 112). The initial network credentials 112 may include a random number as discussed herein. In some examples, the initial network credentials may include the random number and shared secrets, used for symmetric key cryptography. In other examples, the initial network credentials 112 may include the random number and keys for public key cryptography, such as public keys signed by certificate authorities. In still other examples, the initial network credentials 112 may include the random number and a combination of symmetric and asymmetric keys. In some aspects of the disclosure, the integrated tamper resistant device 106 may use the initial network credentials 112 to provide a cryptographic proof as to its identity, and the network solution provider 126 may use the initial network credentials 112 to verify the cryptographic proof provided by the integrated tamper resistant device 106. In some examples, the cryptographic proof based on the initial network credentials 112 may include a digital signature or a message authentication code generated by the integrated tamper resistant device 106. In some examples, the initial network credentials 112 may include symmetric or asymmetric key material that enables secure provisioning of operational network credentials from the network solution provider 126 to the integrated tamper resistant device 106.

The integrated tamper resistant device 106 may encrypt the generated initial network credentials 512 for local usage using a key specific to the integrated tamper resistant device 106. The integrated tamper resistant device 106 may sign the encrypted initial network credentials 514 and may output 515 (e.g., transfer) the encrypted and signed initial network credentials (e.g., the encrypted and signed initial network credentials 320) to the storage device 122. The storage device 122 may store 516 the encrypted and initial signed network credentials (e.g., the encrypted and signed initial network credentials 320).

The integrated tamper resistant device 106 may encrypt the generated initial network credentials 518 for delivery to the network solution provider 126. For example, the integrated tamper resistant device 106 may encrypt the generated initial network credentials using a public key of the network solution provider 126. The integrated tamper resistant device 106 may sign the encrypted initial network credentials 520 and may output 521 (e.g., transfer) the encrypted and signed initial network credentials (e.g., the encrypted and signed initial network credentials 120) to the storage device 122. As shown in FIG. 5B, the storage device 122 may store 522 the encrypted and signed initial network credentials (e.g., the encrypted and signed initial network credentials 120).

As shown in FIG. 5B, the client device manufacturer 100 may obtain 523 the encrypted and signed initial network credentials intended for delivery to the network solution provider 126 (e.g., the encrypted and signed initial network credentials 120) from the storage device 122. In some examples, the client device manufacturer 100 may maintain a database of encrypted and signed initial network credentials from a number of client devices. As further shown in FIG. 5B, the client device manufacturer 100 may provide 525 the encrypted and signed initial network credentials (e.g., the encrypted and signed initial network credentials 120) to the network solution provider 126. In some examples, the client device manufacturer 100 may provide the encrypted and signed initial network credentials along with a number of other encrypted and signed initial network credentials from different integrated tamper resistant devices.

As shown in FIG. 5B, the network solution provider 126 may determine whether the encrypted and signed initial network credentials (e.g., the encrypted and signed initial network credentials 120) have a valid signature 526. The network solution provider 126 may decrypt the encrypted and signed initial network credentials if the signature is valid 528. The network solution provider 126 may store the initial network credentials 530 resulting from the decryption.

Figure 6:
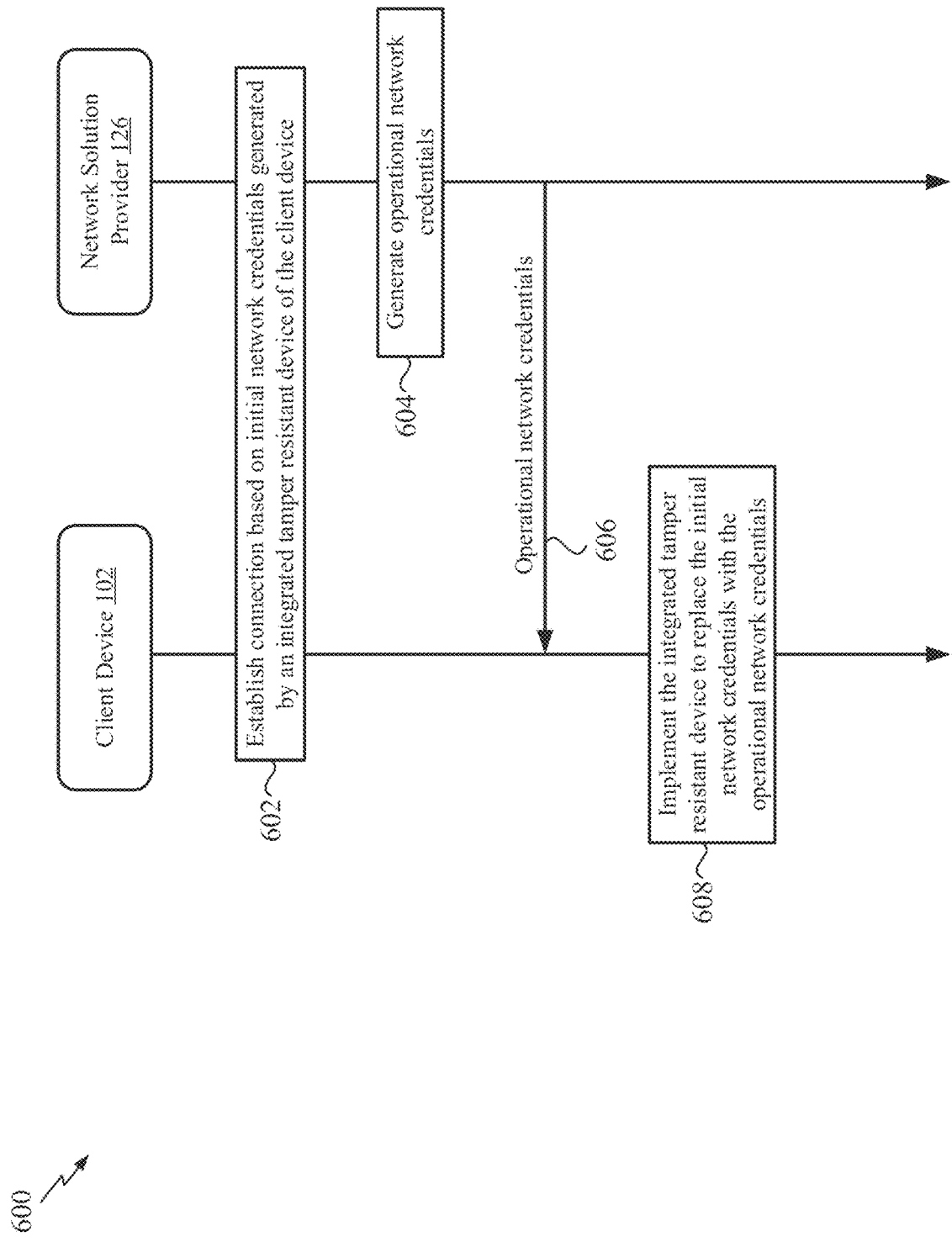
FIG. 6 illustrates a signal flow diagram in accordance with various aspects of the disclosure.

FIG. 6 illustrates a signal flow diagram 600 in accordance with various aspects of the disclosure. FIG. 6 includes the client device 102 and the network solution provider 126. The client device 102 and the network solution provider 126 may have already performed the operations previously described with reference to FIG. 5. The client device 102 and the network solution provider 126 may establish a connection (e.g., an over-the-air connection) based on the initial network credentials generated by an integrated tamper resistant device (e.g., the integrated tamper resistant device 106) of the client device 102. The network solution provider 126 may generate operational network credentials (e.g., permanent subscriber identity data) and may transmit 606 the operational network credentials to the client device 102. The client device 102 may implement the integrated tamper resistant device (e.g., the integrated tamper resistant device 106) of the client device 102 to replace the initial network credentials with the operational network credentials.

Exemplary Apparatus and Method Thereon

Figure 7:
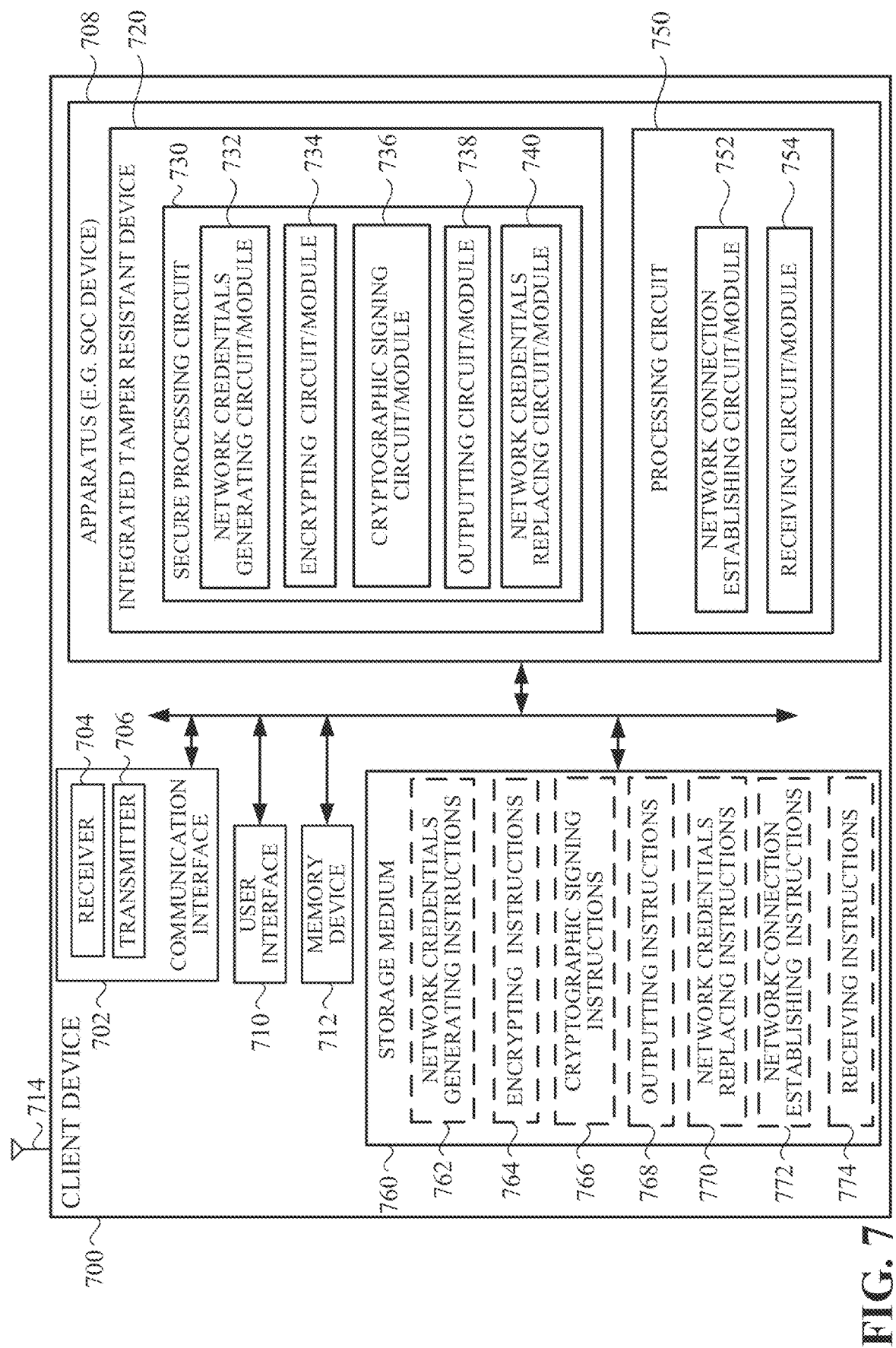
FIG. 7 is an illustration of a client device including an integrated tamper resistant device according to one or more aspects of the disclosure.

FIG. 7 is an illustration of a client device 700 according to one or more aspects of the disclosure. The client device 700 includes a communication interface (e.g., at least one transceiver) 702, an apparatus 708, a user interface 710, a memory device 712, and a storage medium 760. These components can be coupled to and/or placed in electrical communication with one another via a signaling bus or other suitable component, represented generally by the connection lines in FIG. 7. In some aspects of the disclosure, the apparatus 708 may be a system on chip (SoC) device. The signaling bus may include any number of interconnecting buses and bridges depending on the specific application of the apparatus 708 and the overall design constraints. The signaling bus links together the communication interface 702, the apparatus 708, the user interface 710, the memory device 712, and the storage medium 760. The signaling bus may also link various other circuits (not shown) such as timing sources, peripherals, voltage regulators, and power management circuits, which are well known in the art, and therefore, will not be described any further.

The communication interface 702 may be adapted to facilitate wireless communication of the client device 700. For example, the communication interface 702 may include circuitry and/or code (e.g., instructions) adapted to facilitate the communication of information bi-directionally with respect to one or more communication devices in a network. The communication interface 702 may be coupled to one or more antennas 714 for wireless communication within a wireless communication system. The communication interface 702 can be configured with one or more standalone receivers and/or transmitters, as well as one or more transceivers. In the illustrated example, the communication interface 702 includes a receiver 704 and a transmitter 706.

The storage medium 760 may represent one or more computer-readable, machine-readable, and/or processor-readable devices for storing code, such as processor executable code or instructions (e.g., software, firmware), electronic data, databases, or other digital information. For example, the storage medium 760 may be used for storing data that is manipulated by the secure processing circuit 730 (also referred to as a secure processing device) of the integrated tamper resistant device 720 when executing code. The storage medium 760 may be any available media that can be accessed by a general purpose or special purpose processor, including portable or fixed storage devices, optical storage devices, and various other mediums capable of storing, containing or carrying code.

By way of example and not limitation, the storage medium 760 may include, a random access memory (RAM), a static random access memory (SRAM), a dynamic random access memory (DRAM), a register, a configuration of one or more fuses, and/or any other suitable medium for storing code that may be accessed and read by a computer. The storage medium 760 may be embodied in an article of manufacture (e.g., a computer program product). By way of example, a computer program product may include a computer-readable medium in packaging materials. In view of the above, in some implementations, the storage medium 760 may be a non-transitory (e.g., tangible) storage medium. The storage medium 760 may be coupled to the secure processing circuit 730 of the of the integrated tamper resistant device 720, such that the secure processing circuit 730 can read information from, and write information to, the storage medium 760.

Code and/or instructions stored by the storage medium 760, when executed by the secure processing circuit 730 of the integrated tamper resistant device 720, causes the secure processing circuit 730 to perform one or more of the various functions and/or process operations described herein.

The secure processing circuit 730 of the integrated tamper resistant device 720 is generally adapted for processing, including the execution of such code/instructions stored on the storage medium 760. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The secure processing circuit 730 of the integrated tamper resistant device 720 is arranged to obtain, process and/or send data, control data access and storage, issue commands, and control other desired operations. The secure processing circuit 730 may include circuitry configured to implement desired code provided by appropriate media in at least one example. For example, the secure processing circuit 730 may be implemented as one or more processors, one or more controllers, and/or other structure configured to execute executable code. Examples of the secure processing circuit 730 may include a general purpose processor, a secure processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The secure processing circuit 730 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the secure processing circuit 730 are for illustration and other suitable configurations within the scope of the disclosure are also contemplated.

According to one or more aspects of the disclosure, the secure processing circuit 730 may be adapted to perform any or all of the features, processes, functions, operations and/or routines for any or all of the apparatuses described herein. As used herein, the term "adapted" in relation to the secure processing circuit 730 may refer to the secure processing circuit 730 being one or more of configured, employed, implemented, and/or programmed to perform a particular process, function, operation and/or routine according to various features described herein.

According to at least one example of the client device 700, the secure processing circuit 730 may include one or more of a network credentials generating circuit/module 732, a encrypting circuit/module 734, a cryptographic signing circuit/module 736, a outputting circuit/module 738, and a network credentials replacing circuit/module 740 that are adapted to perform any or all of the features, processes, functions, operations and/or routines described herein (e.g., features, processes, functions, operations and/or routines described with respect to FIG. 7).

The network credentials generating circuit/module 732 may include circuitry and/or instructions (e.g., network credentials generating instructions 762 stored on the storage medium 760) adapted to perform functions relating to, for example, generating initial network credentials for accessing a network. The initial network credentials enable a secure environment (e.g., the integrated tamper resistant device 720) of the processing device (e.g., the apparatus 708) to be authenticated by a network solution provider before operational network credentials are provided securely by the network solution provider.

The encrypting circuit/module 734 may include circuitry and/or instructions (e.g., encrypting instructions 764 stored on the storage medium 760) adapted to perform functions relating to, for example, encrypting the initial network credentials.

The cryptographic signing circuit/module 736 may include circuitry and/or instructions (e.g., cryptographic signing instructions 766 stored on the storage medium 760) adapted to perform functions relating to, for example, cryptographically signing the encrypted initial network credentials.

The outputting circuit/module 738 may include circuitry and/or instructions (e.g., outputting instructions 768 stored on the storage medium 760) adapted to perform functions relating to, for example, outputting the encrypted and signed initial network credentials for delivery to the network solution provider.

The network credentials replacing circuit/module 740 may include circuitry and/or instructions (e.g., network credentials replacing instructions 770 stored on the storage medium 760) adapted to perform functions relating to, for example, replacing the initial network credentials with operational network credentials from the network solution provider.

The processing circuit 750 of the apparatus 708 is generally adapted for processing, including the execution of such code/instructions stored on the storage medium 760. In some aspects, the processing circuit 750 may not be able to view, modify, or otherwise access code/instructions that are to be executed by the secure processing circuit 730, such as the network credentials generating instructions 762, the encrypting instructions 764, the cryptographic signing instructions 766, the outputting instructions 768, and the network credentials replacing instructions 770. According to at least one example of the client device 700, the processing circuit 750 may include one or more of a network connection establishing circuit/module 752 and a receiving circuit/module 754 that are adapted to perform some of the features, processes, functions, operations and/or routines described herein (e.g., blocks 910 and 912 in FIG. 9).

The network connection establishing circuit/module 752 may include circuitry and/or instructions (e.g., network connection establishing instructions 772 stored on the storage medium 760) adapted to perform functions relating to, for example, establishing a connection with the network solution provider based on the network credentials.

The receiving circuit/module 754 may include circuitry and/or instructions (e.g., receiving instructions 774 stored on the storage medium 760) adapted to perform functions relating to, for example, receiving operational network credentials including operational subscriber identity data from the network solution provider.

As mentioned above, instructions stored by the storage medium 760, when executed by the secure processing circuit 730 of the integrated tamper resistant device 720, causes the secure processing circuit 730 to perform one or more of the various functions and/or process operations described herein. For example, the storage medium 760 may include one or more of the network credentials generating instructions 762, encrypting instructions 764, cryptographic signing instructions 766, outputting instructions 768, and network credentials replacing instructions 770.

In some aspects of the disclosure, the client device 700 shown in FIG. 7 may be the previously described client device 102. In these aspects, the apparatus 708 may be the previously described system on chip device 104, the integrated tamper resistant device 720 may be the previously described integrated tamper resistant device 106, the secure processing circuit 730 may be the previously described secure processing device 108, and the memory device 712 may be the previously described storage device 122. In some examples, the network credentials generating circuit/module

732 may be the network credentials generating device 110 shown in FIG. 1, the encrypting circuit/module 734 may be the encrypting device 114 shown in FIG. 1, and the cryptographic signing circuit/module 736 may be the signing device 118 shown in FIG. 1.

Figure 8:
FIG. 8 illustrates a method operational in a secure processing circuit of an integrated tamper resistant device in accordance with various aspects of the present disclosure.

FIG. 8 illustrates a method 800 operational in a processing circuit of an integrated tamper resistant device (e.g., the integrated tamper resistant device 720) in accordance with various aspects of the present disclosure. In an aspect of the disclosure, the integrated tamper resistant device 720 generates initial network credentials for accessing a network 802. The initial network credentials enable the integrated tamper resistant device 720 to be authenticated by a network solution provider before operational network credentials are provided securely by the network solution provider. The integrated tamper resistant device 720 encrypts the initial network credentials 804. The integrated tamper resistant device 720 cryptographically signs the encrypted initial network credentials 806. The integrated tamper resistant device 720 outputs the encrypted and signed initial network credentials 808 for delivery to the network solution provider.

Figure 9:
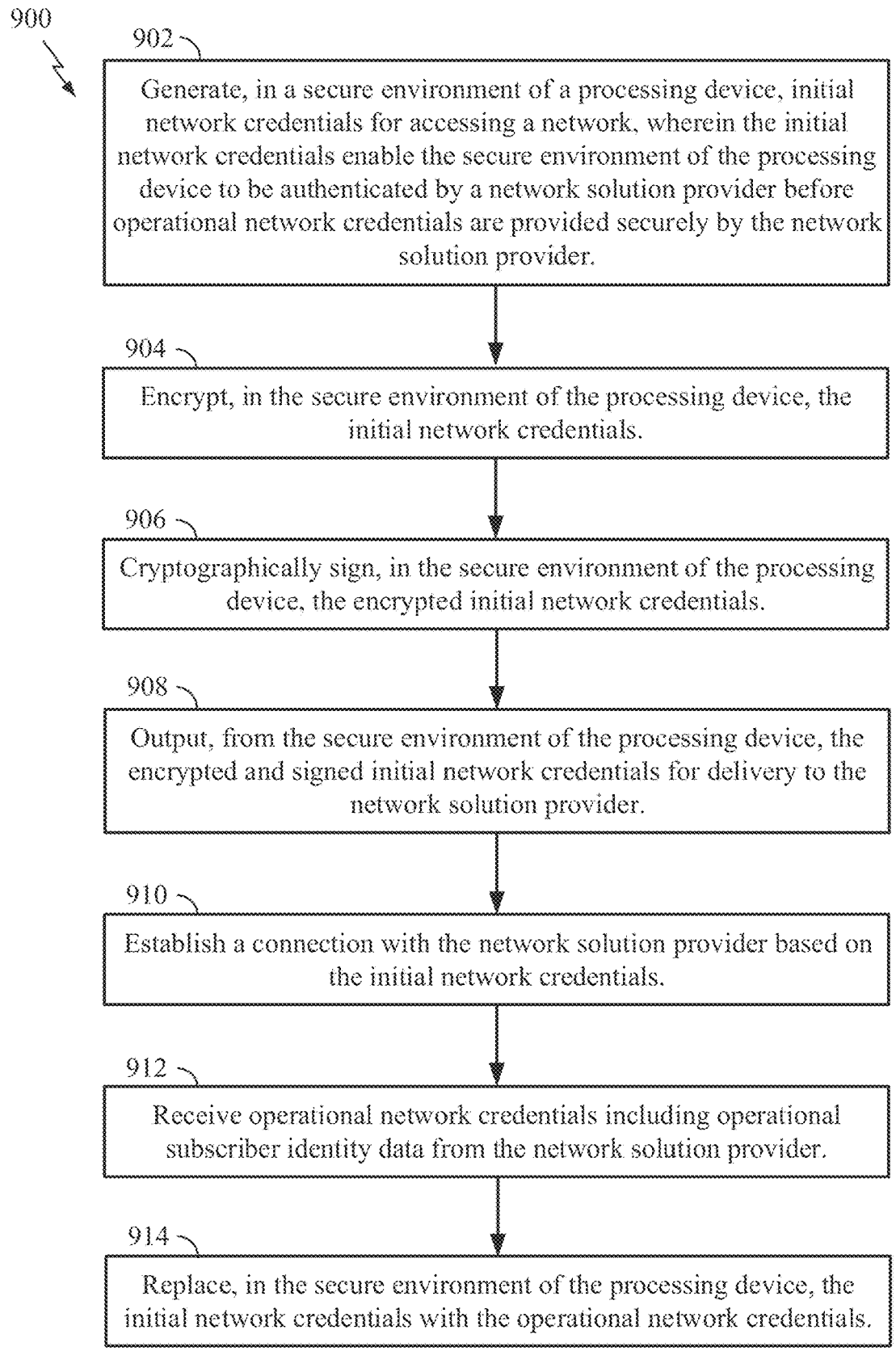
FIG. 9 illustrates a method operational in a client device including a processing circuit in accordance with various aspects of the present disclosure.

FIG. 9 illustrates a method 900 operational in a client device (e.g., the client device 102) that includes a processing device (e.g., the system on chip device (SoC) 104). The processing device may include an integrated tamper resistant device (e.g., the integrated tamper resistant device 720) in accordance with various aspects of the present disclosure. In an aspect of the disclosure, the integrated tamper resistant device 720 of the client device 102 generates initial network credentials for accessing a network 902. The initial network credentials enable the integrated tamper resistant device 720 to be authenticated by a network solution provider before operational network credentials are provided securely by the network solution provider. The integrated tamper resistant device 720 encrypts the initial network credentials 904. The integrated tamper resistant device 720 cryptographically signs the encrypted initial network credentials 906. The integrated tamper resistant device 720 outputs the encrypted and signed initial network credentials 908 for delivery to the network solution provider. The client device 102 establishes a connection with the network solution provider based on the initial network credentials 910. The client device 102 receives operational network credentials including operational subscriber identity data from the network solution provider 912. The integrated tamper resistant device 720 of the client device 102 replaces the initial network credentials with the operational network credentials.

Those of ordinary skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method comprising:
generating, in a secure environment of a tamper resistant device in a client device, initial network credentials for accessing a network, wherein the initial network credentials enable the secure environment of the tamper resistant device to be authenticated by a network solution provider before operational network credentials are provided securely by the network solution provider;
using a cryptographic key that is pre-set in the tamper resistant device to encrypt, in the secure environment of the tamper resistant device, the initial network credentials;
cryptographically signing, in the secure environment of the tamper resistant device, the encrypted initial network credentials; and
outputting the encrypted and signed initial network credentials for delivery to the network solution provider, wherein:
the tamper resistant device is configured for installation by a client device manufacturer into the client device;
the client device manufacturer is not a manufacturer of the tamper resistant device; and
a shrilling key of the manufacturer of the tamper resistant device is used for cryptographically signing, in the secure environment of the tamper resistant device, the encrypted initial network credentials.

2. The method of claim 1, wherein the initial network credentials are opaque to the client device manufacturer.

3. The method of claim 2, wherein the initial network credentials contains at least a random number generated at the secure environment of the tamper resistant device.

4. The method of claim 1, wherein:
the cryptographic key is a public key of the network solution provider.

5. The method of claim 1, wherein the tamper resistant device is implemented by a system on chip (SoC) device.

6. The method of claim 1, wherein generating the initial network credentials comprises generating a secret seed, wherein the secret seed enables the secure environment of the tamper resistant device and the network solution provider to deterministically derive secondary initial network credentials.

7. An apparatus, comprising:
an integrated tamper resistant device configured for installation by a client device manufacturer into a client device, the integrated tamper resistant device including a secure processing circuit configured to:
generate initial network credentials for accessing a network, wherein the initial network credentials enable the integrated tamper resistant device to be authenticated by a network solution provider before operational network credentials are provided securely by the network solution provider;
use a cryptographic key that is pre-set in the integrated tamper resistant device to encrypt the initial network credentials;
cryptographically sign the encrypted initial network credentials; and
output the encrypted and signed initial network credentials for delivery to the network solution provider,
wherein:
the client device manufacturer is not a manufacturer of the integrated tamper resistant device; and
a signing key of the manufacturer of the integrated tamper resistant device is used for cryptographically signing, by the secure processing circuit, the encrypted initial network credentials.

8. The apparatus of claim 7, wherein the initial network credentials generated in the secure processing circuit of the integrated tamper resistant device in the client device include subscriber identity data for the apparatus.

9. The apparatus of claim 8, wherein the subscriber identity data contains at least a random number generated at the integrated tamper resistant device.

10. The apparatus of claim 7, wherein the cryptographic key is a public key of the network solution provider.

11. The apparatus of claim 7, wherein the integrated tamper resistant device is included in a system on chip (SoC) device.

12. The apparatus of claim 7, wherein the secure processing circuit configured to generate the initial network credentials is further configured to:
generate a secret seed, wherein the secret seed enables the secure processing circuit and the network solution provider to deterministically derive secondary initial network credentials.

13. An apparatus comprising:
means for generating, in a secure environment of an integrated tamper resistant device at a client device, initial network credentials for accessing a network, wherein the initial network credentials enable the secure environment of the integrated tamper resistant device to be authenticated by a network solution provider before operational network credentials are provided securely by the network solution provider;
means for encrypting, in the secure environment of the integrated tamper resistant device, the initial network credentials using a cryptographic key that is pre-set in the integrated tamper resistant device;
means for cryptographically signing, in the secure environment of the integrated tamper resistant device, the encrypted initial network credentials; and
means for outputting the encrypted and signed initial network credentials for delivery to the network solution provider,
wherein:
the integrated tamper resistant device is configured for installation by a client device manufacturer into the client device;
the client device manufacturer is not a manufacturer of the integrated tamper resistant device; and
a signing key of the manufacturer of the integrated tamper resistant device is used for cryptographically signing, in the secure environment of the integrated tamper resistant device, the encrypted initial network credentials.

14. The apparatus of claim 13, wherein the initial network credentials generated in the secure environment of the integrated tamper resistant device at the client device include subscriber identity data for the apparatus.

15. The apparatus of claim 14, wherein the subscriber identity data contains at least a random number.

16. The apparatus of claim 13, wherein the cryptographic key is a public key of the network solution provider.

17. The apparatus of claim 13, wherein the integrated tamper resistant device is a system on chip (SoC) device.

18. The apparatus of claim 13, wherein the means for generating the initial network credentials is configured to:
generate a means for the secure environment of the integrated tamper resistant device and the network solution provider to deterministically derive secondary initial network credentials.

19. A non-transitory processor-readable storage medium having instructions stored thereon, which when executed by at least one processing circuit causes the at least one processing circuit to:
- generate initial network credentials within a secure environment implemented by a tamper resistant device at a client device for accessing a network, wherein the initial network credentials enable the processing circuit to be authenticated by a network solution provider before operational network credentials are provided securely by the network solution provider;
- use a cryptographic key that is pre-set in the tamper resistant device to encrypt the initial network credentials;
- cryptographically sign the encrypted initial network credentials; and
- output the encrypted and signed initial network credentials for delivery to the network solution provider, wherein:
- the tamper resistant device is configured for installation by a client device manufacturer into the client device;
- the client device manufacturer is not a manufacturer of the tamper resistant device; and
- a signing key of the manufacturer of the tamper resistant device is used for cryptographically signing, in the secure environment of the tamper resistant device, the encrypted initial network credentials.

20. The non-transitory processor-readable storage medium of claim 19, wherein the initial network credentials generated at the client device include subscriber identity data.

21. The non-transitory processor-readable storage medium of claim 20, wherein the subscriber identity data contains at least a random number.

22. The non-transitory processor-readable storage medium of claim 19, wherein the cryptographic key is a public key of the network solution provider.

23. The non-transitory processor-readable storage medium of claim 19, wherein the at least one processing circuit is a system on chip (SoC) device.

24. The non-transitory processor-readable storage medium of claim 19, wherein the instructions further cause the at least one processing circuit to:
- generate a secret seed, wherein the secret seed enables the processing circuit and the network solution provider to deterministically derive secondary initial network credentials.

* * * * *

UNITED STATES PATENT AND TRADEMARK OFFICE
CERTIFICATE OF CORRECTION

PATENT NO. : 11,943,347 B2
APPLICATION NO. : 16/808167
DATED : March 26, 2024
INVENTOR(S) : Or Elnekaveh et al.

It is certified that error appears in the above-identified patent and that said Letters Patent is hereby corrected as shown below:

In the Claims

Column 17, Line 25, Claim 1, replace "shrilling" with "signing"

Signed and Sealed this
Fourteenth Day of May, 2024

Katherine Kelly Vidal
*Director of the United States Patent and Trademark Office*